(12) United States Patent
Albert

(10) Patent No.: US 6,392,786 B1
(45) Date of Patent: May 21, 2002

(54) ELECTROPHORETIC MEDIUM PROVIDED WITH SPACERS

(75) Inventor: Jonathan D. Albert, Cambridge, MA (US)

(73) Assignee: E Ink Corporation, Cambridge, MA (US)

(*) Notice: Subject to any disclaimer, the term of this patent is extended or adjusted under 35 U.S.C. 154(b) by 31 days.

(21) Appl. No.: 09/606,070

(22) Filed: Jun. 29, 2000

Related U.S. Application Data

(60) Provisional application No. 60/142,003, filed on Jul. 1, 1999.

(51) Int. Cl.[7] ............................................. G02B 26/00
(52) U.S. Cl. ........................ 359/296; 204/606; 345/107
(58) Field of Search ................................ 359/296, 237, 359/250, 253, 265–273, 315; 349/86–90, 155, 156, 158; 204/450, 606; 345/84, 85, 107

(56) References Cited

U.S. PATENT DOCUMENTS

| | | | |
|---|---|---|---|
| 2,800,457 A | 7/1957 | Green et al. ................ 252/316 |
| 3,585,381 A | 6/1971 | Hodson et al. .............. 250/47 |
| 3,612,758 A | 10/1971 | Evans et al. ............. 178/5.4 R |
| 3,668,106 A | 6/1972 | Ota .............................. 204/299 |
| 3,745,070 A | 7/1973 | Yada et al. .................. 148/1.5 |
| 3,756,693 A | 9/1973 | Ota ............................. 350/160 |
| 3,772,013 A | 11/1973 | Wells ............................ 96/1.3 |
| 3,852,092 A | * 12/1974 | Patterson et al. ............... 428/1 |
| 3,870,517 A | 3/1975 | Ota et al. ....................... 96/1.5 |
| 3,909,116 A | 9/1975 | Kohashi ...................... 350/267 |
| 3,912,365 A | 10/1975 | Lowell ..................... 350/160 R |
| 3,990,783 A | 11/1976 | Kohashi ................. 350/161 R |
| 4,001,140 A | 1/1977 | Foris et al. .................. 252/316 |
| 4,062,009 A | 12/1977 | Raverdy et al. ........ 340/324 R |
| 4,071,430 A | 1/1978 | Liebert ................... 204/299 R |
| 4,078,856 A | 3/1978 | Thompson et al. ......... 350/362 |
| 4,093,534 A | 6/1978 | Carter et al. ................ 350/355 |
| 4,126,854 A | 11/1978 | Sheridon .................... 340/373 |
| 4,143,103 A | 3/1979 | Sheridon ........................ 264/4 |
| 4,273,672 A | 6/1981 | Vassiliades ................. 252/316 |
| 4,285,801 A | 8/1981 | Chiang .................. 204/299 R |
| 4,330,788 A | 5/1982 | Hinz et al. .................. 346/157 |
| 4,336,536 A | 6/1982 | Kalt et al. ................... 340/783 |

(List continued on next page.)

FOREIGN PATENT DOCUMENTS

| | | |
|---|---|---|
| EP | 0 180 685 A1 | 10/1984 |
| EP | 0 659 866 A2 | 6/1995 |
| JP | 55-096922 A | 7/1980 |

(List continued on next page.)

OTHER PUBLICATIONS

Beilin, S., et al, "8.5: 2000–Character Electrophoretic Display", SID 86 Digest, 136 (1986).

Blazo, S.F., "High Resolution Electrophoretic Display with Photoconductor Addressing", SID Digest 1982, p. 152.

Chiang, A., "Conduction Mechanism of Charge Control Agents Used in Electrophoretic Display Devices", Proceedings of the S.I.D., 18, 275 (1977).

(List continued on next page.)

Primary Examiner—Huy Mai
(74) Attorney, Agent, or Firm—David J. Cole

(57) ABSTRACT

An encapsulated electrophoretic medium comprises a layer of capsules, each of these capsules comprising a liquid and at least one particle disposed within the liquid and capable of movement upon application of an electric field to the medium. A plurality of spacers are dispersed among the capsules. The medium can be formed by coating a mixture of capsules and spacers on a substrate, or by first coating the capsules and thereafter incorporating the spacers into the layer of capsules.

28 Claims, 1 Drawing Sheet

U.S. PATENT DOCUMENTS

| | | | | |
|---|---|---|---|---|
| 4,390,403 | A | 6/1983 | Batchelder | 204/180 R |
| 4,435,047 | A | 3/1984 | Fergason | 350/334 |
| 4,606,611 | A | 8/1986 | Fergason | 350/334 |
| 4,616,903 | A | 10/1986 | Fergason | 350/334 |
| 4,643,528 | A | 2/1987 | Bell, Jr. | 350/334 |
| 4,655,897 | A | 4/1987 | DiSanto et al. | 204/299 R |
| 4,690,749 | A | 9/1987 | Van Alstine et al. | 204/299 R |
| 4,732,830 | A | 3/1988 | DiSanto et al. | 430/20 |
| 4,742,345 | A | 5/1988 | DiSanto et al. | 340/787 |
| 4,746,917 | A | 5/1988 | DiSanto et al. | 340/787 |
| 4,870,677 | A | 9/1989 | DiSanto et al. | 379/96 |
| 4,889,603 | A | 12/1989 | DiSanto et al. | 204/180.1 |
| 4,919,521 | A | 4/1990 | Tada et al. | 350/362 |
| 4,947,157 | A | 8/1990 | DiSanto et al. | 340/787 |
| 4,947,159 | A | 8/1990 | DiSanto et al. | 340/787 |
| 5,041,824 | A | 8/1991 | DiSanto et al. | 340/787 |
| 5,053,763 | A | 10/1991 | DiSanto et al. | 340/787 |
| 5,066,946 | A | 11/1991 | DiSanto et al. | 340/787 |
| 5,077,157 | A | 12/1991 | DiSanto et al. | 430/20 |
| 5,174,882 | A | 12/1992 | DiSanto et al. | 204/299 R |
| 5,187,609 | A | 2/1993 | DiSanto et al. | 359/296 |
| 5,216,416 | A | 6/1993 | DiSanto et al. | 340/787 |
| 5,223,115 | A | 6/1993 | DiSanto et al. | 204/299 R |
| 5,223,823 | A | 6/1993 | DiSanto et al. | 340/787 |
| 5,247,290 | A | 9/1993 | DiSanto et al. | 345/107 |
| 5,250,938 | A | 10/1993 | DiSanto et al. | 345/107 |
| 5,254,981 | A | 10/1993 | DiSanto et al. | 345/107 |
| 5,266,937 | A | 11/1993 | DiSanto et al. | 345/107 |
| 5,276,438 | A | 1/1994 | DiSanto et al. | 345/107 |
| 5,279,511 | A | 1/1994 | DiSanto et al. | 445/24 |
| 5,279,773 | A | 1/1994 | Saxe | 252/585 |
| 5,293,528 | A | 3/1994 | DiSanto et al. | 345/107 |
| 5,302,235 | A | 4/1994 | DiSanto et al. | 156/643 |
| 5,304,439 | A | 4/1994 | DiSanto et al. | 430/20 |
| 5,315,312 | A | 5/1994 | DiSanto et al. | 345/107 |
| 5,345,251 | A | 9/1994 | DiSanto et al. | 345/107 |
| 5,359,346 | A | 10/1994 | DiSanto et al. | 345/107 |
| 5,402,145 | A | 3/1995 | DiSanto et al. | 345/107 |
| 5,460,688 | A | 10/1995 | DiSanto et al. | 216/5 |
| 5,463,491 | A | 10/1995 | Check, III | 359/296 |
| 5,463,492 | A | 10/1995 | Check, III | 359/296 |
| 5,467,107 | A | 11/1995 | DiSanto et al. | 345/107 |
| 5,497,171 | A | 3/1996 | Teres et al. | 345/43 |
| 5,499,038 | A | 3/1996 | DiSanto et al. | 345/107 |
| 5,530,567 | A | 6/1996 | Takei | 359/51 |
| 5,561,443 | A | 10/1996 | DiSanto et al. | 345/107 |
| 5,627,561 | A | 5/1997 | Laspina et al. | 345/107 |
| 5,650,872 | A | 7/1997 | Saxe et al. | 359/296 |
| 5,754,332 | A | 5/1998 | Crowley | 359/296 |
| 5,779,869 | A | 7/1998 | Helfer et al. | 204/606 |
| 5,815,306 | A | 9/1998 | Sheridon et al. | 359/296 |
| 5,835,577 | A | 11/1998 | Disanto et al. | 379/93.19 |
| 5,866,284 | A | * 2/1999 | Vincent | 359/296 |
| 5,930,026 | A | 7/1999 | Jacobson et al. | 359/256 |
| 5,961,804 | A | * 10/1999 | Jacobson et al. | 359/296 |
| 6,014,247 | A | 1/2000 | Winter et al. | 359/296 |
| 6,017,584 | A | 1/2000 | Albert et al. | 427/313.3 |
| 6,025,896 | A | * 2/2000 | Hqttori et al. | 349/86 |
| 6,067,185 | A | 5/2000 | Albert et al. | 359/296 |
| 6,113,810 | A | 9/2000 | Hou et al. | 252/572 |
| 6,118,426 | A | 9/2000 | Albert et al. | 345/107 |
| 6,120,588 | A | 9/2000 | Jacobson | 106/31.16 |
| 6,120,839 | A | 9/2000 | Comiskey et al. | 427/213.3 |
| 6,124,851 | A | 9/2000 | Jacobson | 345/206 |
| 6,130,773 | A | 10/2000 | Jacobson et al. | 359/296 |
| 6,130,774 | A | 10/2000 | Albert et al. | 359/296 |
| 6,172,798 | B1 | 1/2001 | Albert et al. | 359/296 |
| 6,177,921 | B1 | 1/2001 | Comiskey et al. | 345/107 |

FOREIGN PATENT DOCUMENTS

| | | |
|---|---|---|
| JP | 60-189731 A | 9/1985 |
| JP | 62-299824 A | 12/1987 |
| JP | 01-086116 A | 3/1989 |
| JP | 01-114829 A | 5/1989 |
| JP | 02-223932 A | 9/1990 |
| JP | 05-108016 A | 4/1993 |
| JP | 05-307197 A | 11/1993 |
| JP | 06-089081 A | 3/1994 |
| JP | 10-048673 A | 2/1998 |
| JP | 10-069241 A | 3/1998 |
| JP | 10-142628 A | 5/1998 |
| JP | 10-149118 A | 6/1998 |
| JP | 11-219135 A | 8/1999 |
| JP | 11-337918 A | 12/1999 |
| JP | 11-352422 A | 12/1999 |
| JP | 2000-035598 | 2/2000 |
| WO | WO 97/04398 | 2/1997 |
| WO | WO 98/03896 | 1/1998 |
| WO | WO 98/19208 | 5/1998 |
| WO | WO 98/41898 | 9/1998 |
| WO | WO 98/41899 | 9/1998 |
| WO | WO 99/10767 | 3/1999 |
| WO | WO 99/10768 | 3/1999 |
| WO | WO 99/10769 | 3/1999 |
| WO | WO 00/03291 | 1/2000 |
| WO | WO 00/03349 | 1/2000 |
| WO | WO 00/05704 | 2/2000 |
| WO | WO 00/20921 | 4/2000 |
| WO | WO 00/20922 | 4/2000 |
| WO | WO 00/20923 | 4/2000 |
| WO | WO 00/26761 | 5/2000 |
| WO | WO 00/36465 | 6/2000 |
| WO | WO 00/36560 | 6/2000 |
| WO | WO 00/36666 | 6/2000 |

OTHER PUBLICATIONS

Chiang, A., "Reduction of Lateral Migration in Matrix Addressed Electrophoretic Display", Xerox Disclosure Journal, 5, 73 (1980).

Chiang, A., et al., "A High Speed Electrophoretic Matrix Display", SID 80 Digest (1980), 114.

Chiang, A., et al., "A Stylus Writable Electrophoretic Display Device", SID 79 Digest (1979), 44.

Comiskey, B., et al., "An electrophoretic ink for all–printed reflective electronic displays", Nature, 394, 253 (1998).

Comiskey, B., et al., "Electrophoretic Ink: A Printable Display Material", SID 97 Digest (1997), p. 75.

Croucher, M.D., et al., "Electrophoretic Display: Materials as Related to Performance", Photog. Sci. Eng., 25, 80 (1981).

Dalisa, A.L., "Electrophoretic Display Technology", IEEE Trans. Electron Dev., ED–24, 827 (1977).

Dalisa, A.L., "Electrophoretic Displays", in Pankove, J.L. (ed.), "Display Devices", Springer–Verlag, Berlin (1980), pp. 215–232.

Drzaic, P., et al., "A Printed and Rollable Bistable Electronic Display", SID 98 Digest (1998), p. 1131.

Fitzhenry, B., "Identification of a Charging Mechanism using Infrared Spectroscopy", Appl. Spectroscopy, 33, 107 (1979).

Fitzhenry, B., "Optical effects of adsorption of dyes on pigment used in electrophoretic image displays", Appl. Optics., 18, 3332 (1979).

Fitzhenry–Ritz, B., "Optical Properties of Electrophoretic Image Diplays", Proceedings of the S.I.D., 22, 300 (1981).

Flaherty, "What Did Disappearing Ink Grow up to Be? Electronic Ink, " The New York Times, May 6, 1999.

Goodman, L.A., Passive Liquid Displays: Liquid Crystals, Electrophoretics and Electrochromics, Proceedings of S.I.D., 17, 30 (1976).

Guernsey, L., "Beyond Neon: Electronic Ink", New York Times, Jun. 3, 1999, p. G11.

Gutcho, M.H., Microcapsules and MIcroencapsulation Techniques, Noyes Data Corp., Park Ridge NJ, (1976), pp. 65–130, 178–193, 279–343.

Harbour, J.R., et al., "Subdivided electrophoretic display", Xerox Disclosure Journal, 4, 705 (1979).

Hopper, M.A., et al., "An Electrophoretic Display, Its Properties, Model and Addressing", IEEE Trans. Electron Dev., ED–26, 1148 (1979).

Jacobson, J., et al., "The last book", IBM Systems J., 36, 457 (1997).

Jin et al., "Optically Transparent, Electrically Conductive Composite Medium", Science, 255, 446 (1992).

Klein, A., "Will the Future Be Written in E–Ink?", Wall Street Journal, Jan. 4, 2000, p. 1.

Kornfeld, A Defect–Tolerant Active–Matrix Electrophoretic Display, SID Digest, 1984, p. 142.

Lewis et al., "Gravitational, Inter–Partical and Partical–Electrode Forces in the Electrophoretic Display", Proceedings of the SID, 18, 235 (1977).

Lewis, J.C., et al., "Electrophoretic Displays", in Kmetx, A.R., et al., "Nonemissive Electrooptic Displays", Plenum Press, New York (1975).

Minnema, L., et al., "Pattern Generation in Polyimide Coatings and Its Application in an Electrophoretic Image Display", Polym. Eng. Sci., 28, 815 (1988).

Murau, P., "Characteristics of an X–Y Addressed Electrophoretic Image Display (EPID)," SID 84 Digest (1984) p. 141.

Murau, P., et al., "The understanding and elimination of some suspension instabilities in an electrophoretic display", J. Appl. Phys., 49, 4820 (1978).

Nakamura, E., et al., "Development of Electrophoretic Display Using Microcapsulated Suspension," SID 98 Digest (1998), p. 1014.

Negroponte, N., et al., "Surfaces and Displays," Wired, Jan.1997, p. 212.

Ota, I., et al., "Developments in Electrophoretic Displays", Proceedings of the SID, 18, 243 (1977).

Ota, I., et al., "Electrophoretic display devices", Laser 75 Optoelectronics Conference Proceedings, 145 (1975).

Ota, I., et al., "Electrophoretic Image Display (EPID) Panel", Proceedings of the IEEE, 61, 832 (1973).

Saitoh, M., et al., "A newly developed electrical twisting ball display", Proceedings of the SID, 23, 249 (1982).

Sheridon, N.K., et al., "The Gyricon—A Twisting Ball Display", Proceedings of the SID, 18, 289 (1977).

Shiffman, R.R., et al., "An Electrophoretic Image Display with Internal NMOS Address Logic and Display Drivers, "Proceedings of the SID, 1984, vol. 25, 105 (1984).

Shiwa, S., et al., "Electrophoretic Display Method Using Ionographic Technology," SID 88 Digest (1988), p. 61.

Singer, B., et al., "An X–Y Addressable Electrophoretic Display," Proceedings of the SID, 18, 255 (1977).

Vance, D.W., "Optical Characteristics of Electrophoretic Displays", Proceedings of the SID, 18, 267 (1977).

Vandegaer, J.E. (ed.), "Microencapsulation Processes and Applications", pp. v–x, 1–180 (Plenum Press, New York 1974).

* cited by examiner

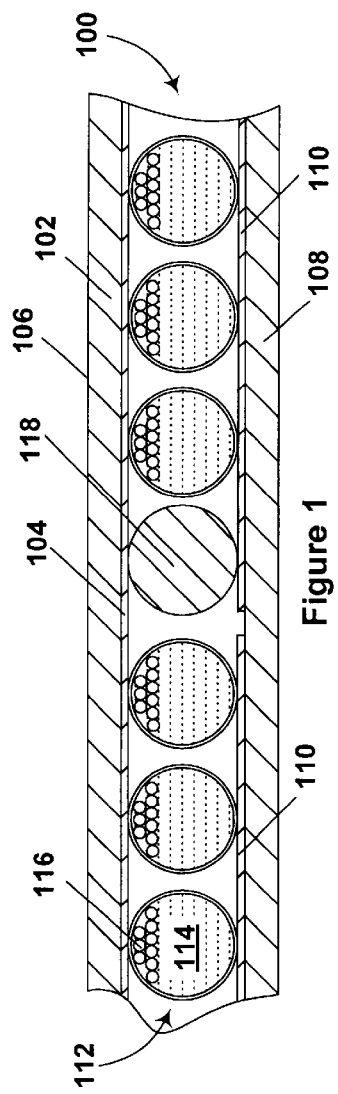
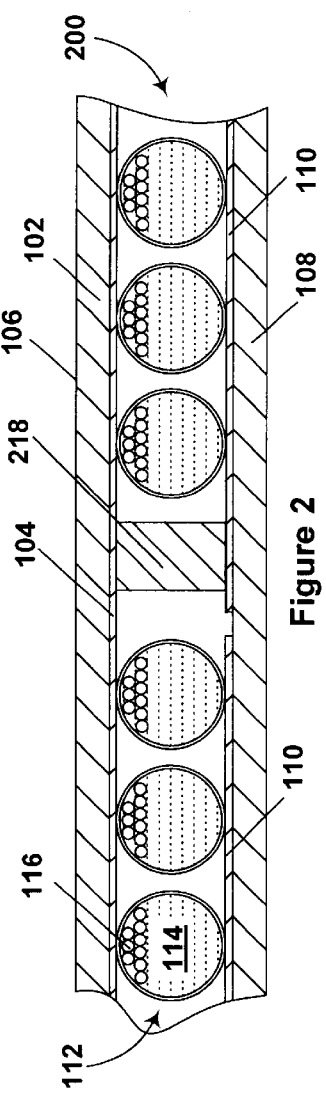
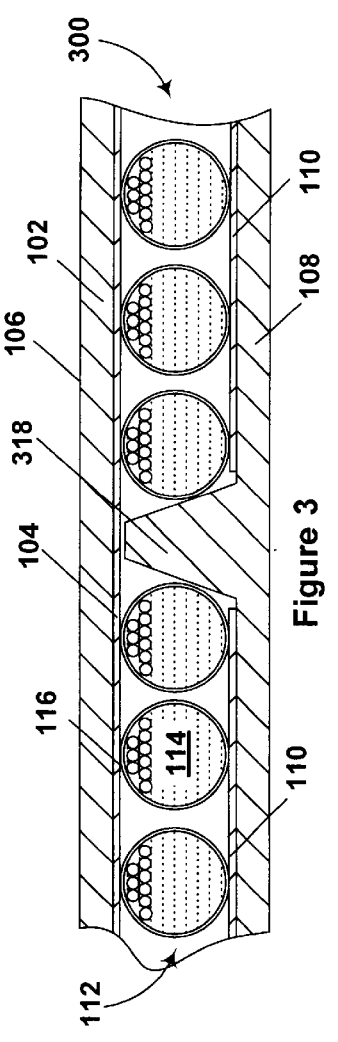
Figure 1
Figure 2
Figure 3

ELECTROPHORETIC MEDIUM PROVIDED WITH SPACERS

REFERENCE TO RELATED APPLICATION

This application claims priority from Provisional Application Serial No. 60/142,003 filed Jul. 1, 1999.

FIELD OF THE INVENTION

The present invention relates to an electrophoretic medium provided with spacers, and to an electrophoretic display incorporating such a medium.

BACKGROUND OF THE INVENTION

Electrophoretic displays have been the subject of intense research and development for a number of years. Such displays can have attributes of good brightness and contrast, wide viewing angles, state bistability, and low power consumption when compared with liquid crystal displays. (The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element.) Nevertheless, problems with the long-term image quality of these displays have prevented their widespread usage. For example, particles that make up electrophoretic displays tend to cluster and settle, resulting in inadequate service-life for these displays.

An encapsulated, electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

One major reason why encapsulated electrophoretic displays can be produced inexpensively by printing processes is that the electrophoretic medium itself has substantial mechanical strength and cohesion; typically the individual capsules are bound together by a polymeric binder to increase the cohesion of the layer. Thus, not only can the display medium itself be printed, but as described in copending application Ser. No. 09/141,103 and the corresponding International Application No. PCT/US98/17735 (Publication No. WO 99/10768), an electrode may be formed by printing a conductive material directly on to the electrophoretic medium; alternatively, an electrode pre-formed on a substrate can be laminated on to the electrophoretic medium, which is able to withstand the heat and pressure required for such lamination without damage. In such printed or laminated structures, the mechanical strength and cohesion of the electrophoretic medium maintain the requisite spacing between the electrodes disposed on either side of the medium without any need for mechanical spacers or similar devices to control this spacing. Accordingly, if the electrodes (and any substrates attached thereto) are flexible, the encapsulated electrophoretic display can be curved or rolled without affecting the display qualities of the device; see, for example, Drzaic et al., "A Printed and Rollable Bistable Electronic Display SID (Society for Information Display) 98 Digest, page 1131 (1998), which illustrates a flexible encapsulated electrophoretic display being rolled around a pencil without damage.

Although, as described above, encapsulated electrophoretic media possess considerable mechanical strength and cohesion, it is of course important that none of the capsules in such displays be ruptured, since rupture of even a small number of capsules allows the internal phase of the capsules (this internal phase comprising the electrophoretic particles themselves and the liquid medium in which they are suspended) to leak through the medium, thus adversely affecting the appearance of the display. It has now been found that, by providing spacers within such an encapsulated electrophoretic medium, the resistance of the medium to mechanical stresses can be increased, thereby enabling the medium to be used in applications, and under processing conditions, which would otherwise result in unacceptable capsule rupture.

SUMMARY OF THE INVENTION

In one aspect, this invention provides an encapsulated electrophoretic medium comprising a layer of capsules, each of these capsules comprising a liquid and at least one particle disposed within the liquid and capable of moving therethrough on application of an electric field to the medium. The medium also comprises a plurality of spacers dispersed among the capsules.

In another aspect, this invention provides a method of forming an electrophoretic display; this method comprises (a) providing a substrate; and (b) providing, adjacent the substrate, an encapsulated electrophoretic medium comprising a layer of capsules, each of these capsules comprising a liquid and at least one particle disposed within the liquid and capable of moving therethrough on application of an electric field to the medium. The medium also comprises a plurality of spacers dispersed among the capsules.

BRIEF DESCRIPTION OF THE DRAWINGS

FIGS. 1, 2 and 3 of the accompanying drawings are schematic cross-sections, taken perpendicular to the plane of the electrodes of the displays, through three different preferred encapsulated electrophoretic displays of the present invention. These drawings are not to scale, emphasis instead generally being placed upon illustrating the principles of the invention.

DETAILED DESCRIPTION OF THE INVENTION

As already mentioned, in the encapsulated electrophoretic medium of the present invention a plurality of spacers are dispersed among the capsules. These spacers serve to relieve some of the pressure which would otherwise be applied to the capsules when substantial pressures are placed upon the electrophoretic medium, thus enabling the medium to withstand, without capsule rupture, higher pressures than it would be able to withstand in the absence of the spacers.

It should be emphasized that the spacers used in the present medium serve an entirely different function than the spacers used in conventional liquid crystal displays. As already mentioned, an encapsulated electrophoretic medium possesses considerable mechanical strength and cohesion, and hence is well able to accurately control the spacing between its associated electrodes without the need for spacers. In contrast, in a conventional liquid crystal display the electro-optically active layer of liquid crystal is a true liquid and is incapable of itself maintaining any specific spacing between the layers of the display disposed on opposed sides of the liquid crystal layer. Furthermore, such a liquid crystal display requires the maintenance of a very small gap, typically about 2 to 7 $\mu$m, over the entire width of the display, which may be 12 inches (304 mm) or more. Since the operation of the liquid crystal display depends upon the liquid crystal rotating the plane of polarization of light, and this rotation is proportional to the thickness of the liquid crystal layer, the gap has to maintained with great accuracy. Even though liquid crystal displays are typically constructed using rigid glass plates, it is wholly impracticable to maintain the necessary spacing with sufficient accuracy over the whole width of the display without resorting to the use of spacers within the liquid crystal layer, since otherwise even modest pressure upon the surface of the display would be sufficient to cause enough change in the gap to produce substantial changes in the appearance of the display.

As an illustration of the difference in function between the spacers used in the present invention and those used in conventional liquid crystal displays, it may be noted that it is not essential that the thickness of the spacers be exactly the same as the thickness of the electrophoretic medium when no pressure is applied thereto. The thickness of the spacers may be slightly less than the thickness of the medium so that, when the medium is not under pressure, its thickness is determined by the capsules, but as the pressure thereon is increased and the capsules deform slightly, the layers on either side of the medium come into contact with the spacers, the spacers relieve the stress on the capsules, thereby preventing this stress building up to a level at which capsule rupture may occur. For example, in a typical application in which the layer of capsules forming the electrophoretic medium has the form of a lamina having a thickness substantially less than its other two dimensions, the dimension of the spacers parallel to the thickness of the lamina may be from about 0.9 to about 1.0 times this thickness, although a spacer dimension close to 1.0 times this thickness is preferred. For example, if the capsules are 100 $\mu$m in diameter, the spacers may have the form of glass spheres 100 $\mu$m or slightly less in diameter.

The spacers used in the present invention may be formed from any material capable of providing the necessary stress relief to the capsules when pressure is applied to the electrophoretic medium; it will be appreciated that the choice of spacer material may vary depending upon the application in which the medium is to be employed and thus the type and magnitude of pressures to which the capsules will be exposed. Thus, die spacers may be formed from a rigid material, for example glass, or from a flexible material, for example a flexible polymer such as polyethylene, provided that the material is not so flexible that it fails to provide the necessary stress relief. Combinations of materials, for example glass spheres coated with polymer, may also be used. It is generally preferred that the spacers be formed from a substantially transparent material since colored (which term is used to include black and white) spacers may adversely affect the quality of the image produced by an electrophoretic display.

The spacers may have a variety of shapes; for example, each of the spacers may have substantially the form of a sphere, rod, cone, pyramid, cone or a frustum of a cone or pyramid. Mixtures of spacers of differing shapes may also be used.

The ratio of spacers to capsules in the present electrophoretic medium may vary widely, depending upon the intended application of the medium. This ratio is, at least in part, a compromise between two competing considerations. If too few spacers are used, certain capsules not close to a spacer may be exposed to undesirable stress levels. On the other hand, since the spacers cannot undergo the changes in optical characteristics which the capsules undergo, the spacers may tend to introduce artifacts into the image produced by the display, and the risk of such artifacts becoming noticeable increases with the number of spacers used. In generally, the ratio of spacers to capsules will be in the range of from about 1:100 to about 1:1,000,000, and preferably in the range of about 1:1,000 to about 1:100,000.

To form an electrophoretic display, the encapsulated electrophoretic medium of the present invention will typically be provided with first and second electrodes disposed on opposed sides of the medium, at least one of the first and second electrodes being light transmissive. The electrophoretic display may also comprise first and second substrates disposed on opposed sides of the electrophoretic medium, these first and second substrates being secured to the first and second electrodes respectively; typically, the first and second electrodes are formed on their respective substrates by any convenient type of printing or coating process.

In one form of such a display, the first and second electrodes and the first and second substrates are all flexible, so that the entire display is flexible. Such a display can be made paper-thin so as to resemble a conventional poster or leaf of a book. The provision of spacers in such a display may be useful to prevent damage to the display if a portion of the display is curved very sharply, as may happen, for example, if the display is being manually manipulated to fit it into a frame or similar structure.

Another form of such a display includes a touch sensing means disposed on the opposed side of one of the first and second electrodes from the electrophoretic medium, so that the display functions as a touch screen. As is well-known to those skilled in the relevant art, the touch sensing means of a touch screen typically comprises two continuous orthogonal electrodes on two separate transparent substrates, these continuous electrodes acting as an analog voltage divider. Alternatively, such a touch sensing means may comprise two arrays of transparent electrodes on separate transparent substrates, for example, a series of parallel row electrodes on one substrate and a series of parallel column electrodes on the other, or a matrix array of electrodes on a one substrate and a single continuous electrode on the other. In all cases, the two electrodes or arrays of electrodes lie parallel to one another but are spaced a short distance apart by mechanical spacers, a liquid film or pressurized gas. At least the front substrate (that adjacent the user) is made flexible so that application of modest pressure, as from a user's finger on the front substrate, will cause contact between the electrodes (or between at least one electrode in each array), thus enabling associated electronics to generate a signal indicating where on the sensing means the pressure was applied. The touch sensing means is affixed to a screen (typically the screen of a cathode ray tube, or much less commonly that of a liquid crystal display) on which images are formed, so that the user appears to be touching the image on the screen.

Encapsulated electrophoretic displays have substantial advantages over both cathode ray tubes and liquid crystal displays in touch screens. Both cathode ray tubes and conventional liquid crystal displays operate in emission (the liquid crystal displays being back-lit) so that their images become difficult to read in strong sunlight, for example when a drive-up automatic teller machine (ATM) is placed outside a bank. In contrast, electrophoretic displays operate by reflection, so they are readily readable even under the strongest light. Also, electrophoretic displays are much less bulky than cathode ray tubes, an important consideration in ATM's.

Although the pressure generated by a user's finger pressing upon a touch screen is relatively small, a user may accidentally hit the screen more sharply that intended, or hit it with a fingernail, finger ring, watch band, bracelet or the like which may generate pressures much greater than simple pressure with a finger tip. Accordingly, electrophoretic displays used in touch screens may advantageously incorporate spacers in accordance with the present invention to prevent damage to the display when substantial pressure is exerted thereon.

Although a touch screen itself requires two electrodes and the electrophoretic display also requires two electrodes, in some cases (depending upon the type of touch sensing means used) it may be possible to reduce the complexity and expense of a touch screen with an electrophoretic display by using only three electrodes. If the rear electrode of the touch screen is fabricated upon a very thin substrate, it may be possible to use this electrode as both the rear electrode of the touch screen and the front electrode of the electrophoretic display; such a dual-function electrode may conveniently be of the continuous electrode type (i.e., in the form of a single electrode extending across the entire area of the touch screen display). Alternatively a single substrate, preferably a flexible plastic film, could be coated on both sides with a continuous layer of conductive material so that this coated substrate serves as both the rear electrode of the touch screen and the front electrode of the electrophoretic display.

Another application of the present invention may be providing encapsulated electrophoretic media which can be laminated under a wider range of conditions than similar prior art media. As already mentioned, in the preparation of an encapsulated electrophoretic display it is common practice to form an electrode on a substrate and then to laminate this substrate/electrode combination to an encapsulated electrophoretic medium coated on a different substrate. This lamination is normally conducted using both heat and pressure, and this combination of heat and pressure can impose substantial stress on the capsules, because in addition to the external pressure imposed by the laminator, the capsules are subject to an internal pressure caused by the thermal expansion of the electrophoretic fluid within the capsules. By providing the electrophoretic medium with spacers in accordance with the present invention, the stresses imposed upon the capsules during the lamination can be reduced, thus widening the range of pressure and/or temperature which can be used. Since the choice of lamination adhesives is limited largely by the temperatures and pressures which can be employed in the lamination, widening the allowable pressure and temperature ranges broadens the range of useable lamination adhesives, and may thus permit the use of adhesives having certain desirable properties (for example, increased durability) which would not otherwise be useable with the electrophoretic medium.

In some embodiments of the present invention, the spacers will be discrete entities which are mixed among the capsules either before or after the capsules are formed into the capsule layer, as described in more detail below. However, at least some of the spacers may also be secured to, or integral with, one of the electrodes or the substrates of the electrophoretic display. For example, if one or both of the substrates has the form of a flexible plastic film, such a film could bear projection or ridges which could act as spacers. Such projections or ridges could useful taper towards the viewing surface of the display; for example projections on a rear substrate could be frusto-conical or frusto-pyramidal in shape so that when the substrate is printed or coated with the layer of capsules, the capsules will overlay the outer parts of the broad base of the projections or ridges, leaving only the relatively narrow tops of the projections exposed in the final display, thus reducing the possibility of the projections introducing visible artifacts into the image provided by the display.

The exact method used to incorporate the spacers into the capsule layer may vary, and the optimum method may vary depending upon the number and type of spacers employed. As already mentioned, typically the capsule layer is rendered coherent by the provision of a binder, which lies between the capsules and binds them together. The capsule layer is formed by printing or coating a mixture of the capsules in the binder on to the surface of a substrate; conveniently, a conductive coating is provided on the substrate prior to the printing or coating so that this conductive coating can act as one of the electrodes of the final display. In one method of forming a spacing-containing capsule layer, the spacers are admixed with the capsules and the binder, and the resultant mixture is printed or coated on to the surface of the substrate. This method is especially suitable for spacers (for example, polymeric spacers) which have a density similar to that of the capsule/binder mixture. In a second method, the usual mixture of capsules and binder is first coated on to the surface of the substrate and thereafter the spacers are dispersed among the capsules. In either method, typically, after the spacer-containing layer of capsules has been formed on the substrate, a second substrate is laminated to the layer of capsules so that the two substrates lie on opposed sides of this layer. This second substrate may bear a conductive layer which acts as the second electrode of the final electrophoretic display.

Although reference has been made throughout the foregoing description to capsules and a binder in a manner which suggests that the encapsulated electrophoretic medium of die present invention comprises a plurality of discrete capsules (and the accompanying drawings illustrate this form of the invention), the present medium may also have the form of a "polymer-dispersed electrophoretic display", hereafter abbreviated "PDED". Essentially, a PDED is a two-phase system having a discontinuous phase, which comprises a plurality of discrete droplets of an electrophoretic fluid (as usual, comprising a liquid and at least one particle disposed within the liquid and capable of moving therethrough on application of an electric field to the liquid), and a continuous phase of a polymeric material. The discrete droplets of electrophoretic fluid within a PDED may be referred to as capsules or microcapsules even though no discrete capsule membrane is associated with each individual droplet. Accordingly, references to "capsules" herein arc to be construed as extending to PDED's, which arc considered to be subsets of encapsulated electrophoretic displays.

Embodiments of the invention will now be described, though by way of illustration only, with reference to the accompanying drawings which, as already stated, show schematic cross-sections through three different encapsulated electrophoretic displays of the present invention, these cross-sections being taken perpendicular to the plane of the electrodes of the displays.

FIG. 1 of the accompanying drawings shows an encapsulated electrophoretic display (generally designated 100) of the present invention. This display comprises a transparent front substrate 102 coated with a continuous transparent front electrode 104 which may, for example, be formed from indium tin oxide (ITO). The exposed (outer) surface 106 (the top surface as illustrated in FIG. 1) of the front substrate 102 acts as a viewing surface through which an observer views the display 100; if, for example, the display 100 is to be used as part of a touch screen display, the touch sensing means of the display would be mounted on the surface 106. The display 100 further comprises a rear substrate 108 coated with a plurality of discrete rear electrodes 110, which define individual pixels of the display 100; only two of the rear electrodes 110 are shown in FIG. 1. Between the electrodes 104 and 110 are disposed a plurality of microcapsules (generally designated 112); each of these microcapsules comprises a capsule wall enclosing a colored liquid 114 in which are suspended charged colored particles 116 of a color different from that of the liquid 114. For case of illustration, the microcapsules 112 are shown as spherical in the FIGS., although in practice it is preferred that they be of the non-spherical shapes described in commonly-owned U.S. Pat. No. 6,067,185. The microcapsules 112 are sufficient, by themselves, to maintain the spacing between the electrodes 104 and 110. However, for reasons already explained above, there are dispersed among the microcapsules 112 a plurality of spacers 118 (only one of which is shown in FIG. 1) having the form of glass spheres of a diameter essentially the same as that of the microcapsules 112.

As previously mentioned, the individual microcapsules 112 are normally bound to each other and to the electrodes 104 and 110 by a polymeric binder. This binder is omitted from FIGS. 1, 2 and 3 for ease of illustration and comprehension.

FIG. 2 illustrates a second encapsulated electrophoretic display (generally designated 200) of the present invention; this display 200 closely resembles the display 100 shown in FIG. 1, except that the spherical spacers 118 are replaced by cylindrical rod spacers 218, only one of which is shown in FIG. 2. The spacers 218 may be formed of glass. polymer or other materials.

FIG. 3 illustrates a third encapsulated electrophoretic display (generally designated 300) of the present invention; this display 300 closely resembles the displays 100 and 200 shown in FIGS. 1 and 2 respectively, except that the spacers 118 and 218 are replaced by frusto-conical spacers 318 (only one of which is shown in FIG. 3), which are integral with the rear substrate 108. It should be noted that the microcapsules 112 on either side of the spacer 318 overlap part of the base of the spacer, thus reducing the risk that the spacer 318 will introduce any visible artifact into the display 300. Also, it should be noted that the upper end (in FIG. 3) of the spacer 318 is spaced slightly from the front electrode 104, thus allowing the front substrate 102, the front electrode 104 and the microcapsules 112 to deform slightly before the front electrode 104 contacts the spacer 318.

Apart from the use of spacers, the encapsulated electrophoretic displays of the present invention resemble prior art encapsulated electrophoretic displays, and hence the present displays can make use of any known materials and processes for the production of such displays, as described, for example, in U.S. Pat. Nos. 6,017,584 and 6,067,185, and in copending commonly-assigned application Ser. No. 09/413,444, filed Oct. 6, 1999, and the corresponding International Application PCT/US99/23313 (Publication No. WO 00/20922); the entire disclosures of all these patents and applications are herein incorporated by reference.

The successful construction of an encapsulated electrophoretic display requires the proper interaction of several different types of materials and processes. As already mentioned, typically such an encapsulated electrophoretic display will include a polymeric binder to bind the capsules into a coherent layer and/or to act as an adhesive to adhere the capsules to a substrate. Materials such as the polymeric binder, a capsule membrane or wall, electrophoretic particles, and the suspending fluid must all be chemically compatible. The capsule membranes may engage in useful surface interactions with the electrophoretic particles, or may act as an inert physical boundary between the fluid and the binder.

In an encapsulated electrophoretic display, the binder material surrounds the capsules and separates the two electrodes. This binder material must be compatible with the capsules and electrodes and should possess properties that allow for facile printing or coating. It may also possess barrier properties for water, oxygen, ultraviolet light, the electrophoretic fluid, or other materials, Further, it may contain surfactants and cross-linking agents, which could aid in coating or durability. A polymer-dispersed electrophoretic display may be of the emulsion or phase separation type.

Desirably, the encapsulated electrophoretic medium has a plurality of non-spherical capsules disposed substantially in a single layer on a substrate. The non-spherical capsules can have a substantially planar surface on at least one side proximate a substrate. Also, the capsules can be close-packed.

Non-spherical microcapsules can be formed during the encapsulation phase, by, for example, using a non-uniform shear field or a compressive pressure. Such non-spherical capsules can also be formed during the processing of the display when the binder is drying or curing. In such a system, as the binder shrinks, it pulls capsules close to one another and pulls the capsules down toward the substrate on which they have been coated. For example, an aqueous evaporative binder, such as a waterborne acrylic, urethane, or poly(vinyl alcohol), tends to exhibit such shrinking properties. Typically, a fraction of the binder, such as water, evaporates. Other evaporative binders, emulsions, or solutions also arc suitable. The solvent need not be water, but can be an organic liquid or a combination of liquids.

Also, non-spherical capsules can be formed, for example, by applying a force to the film as it is drying or curing to permanently deform the capsules. Such a force can be applied by a pair of rollers, by a vacuum lamination press, by a mechanical press, or by any other suitable means. Such non-spherical capsules can also be formed by stretching the cured film in one or both of the planar axes of the film. After completion of the curing process, the capsule can protrude above the surface of the cured film, resulting in a lens effect that enhances the optical properties of the capsule. Finally, the capsule also can be formed of a material which softens in the binder, thus allowing the capsules to deform to form a flat surface when the capsules and binder are laid down and the binder is cured.

In another embodiment, a PDED is constructed in a manner similar to a polymer-dispersed liquid crystal display.

A fluid is mixed with a binder. Typically, the fluid can be an oil. As the binder is dried or is cured, tie fluid is pulled into non-spherical cavities. These fluid-containing cavities can be elastomeric capsules. These cavities lack discrete capsule walls.

The following Sections A–E describe useful materials for use in the various components of the encapsulated electrophoretic displays of the present invention.

A. Electrophoretic Particles

There is much flexibility in the choice of particles for use in electrophoretic displays, as described above. For purposes of this invention, a particle is any component that is charged or capable of acquiring a charge (i.e., has or is capable of acquiring electrophoretic mobility), and, in some cases, this mobility may be zero or close to zero (i.e., the particles will not move). The particles may be neat pigments, dyed (laked) pigments or pigment/polymer composites, or any other component that is charged or capable of acquiring a charge. Typical considerations for the electrophoretic particle are its optical properties, electrical properties, and surface chemistry. The particles may be organic or inorganic compounds, and they may either absorb light or scatter light. The particles for use in the invention may further include scattering pigments, absorbing pigments and luminescent particles. The particles may be retroreflective, such as corner cubes, or they may be electroluminescent, such as zinc sulfide particles, which emit light when excited by an AC field, or they may be photoluminescent. Zinc sulfide electroluminescent particles may be encapsulated with an insulative coating to reduce electrical conduction. Finally, the particles may be surface treated so as to improve charging or interaction with a charging agent, or to improve dispersability.

One particle for use in electrophoretic displays of the invention is titania. The titania particles may be coated with a metal oxide, such as aluminum oxide or silicon oxide, for example. The titania particles may have one, two, or more layers of metal-oxide coating. For example, a titania particle for use in electrophoretic displays of the invention may have a coating of aluminum oxide and a coating of silicon oxide. The coatings may be added to the particle in any order.

The electrophoretic particle is usually a pigment, a polymer, a laked pigment, or some combination of the above. A neat pigment can be any pigment, and, usually for a light colored particle, pigments such as rutile (titania), anatase (titania), barium sulfate, kaolin, or zinc oxide are useful. Some typical particles have high refractive indices, high scattering coefficients, and low absorption coefficients. Other particles are absorptive, such as carbon black or colored pigments used in paints and inks. The pigment should also be insoluble in the suspending fluid. Yellow pigments such as diarylide yellow, Hansa yellow, and benzidin yellow have also found use in similar displays. Any other reflective material can be employed for a light colored particle, including non-pigment materials, such as metallic particles.

Useful neat pigments include, but are not limited to, $PbCrO_4$, Cyan blue GT 55-3295 (American Cyanamid Company, Wayne, N.J.), Cibacron Black BG (Ciba Company, Inc., Newport, Del.), Cibacron Turquoise Blue G (Ciba), Cibalon Black BGL (Ciba), Orasol Black BRG (Ciba), Orasol Black RBL (Ciba), Acetamine Black, CBS (E. I. du Pont de Nemours and Company, Inc., Wilmington, Del., hereinafter abbreviated "du Pont"), Crocein Scarlet N Ex (du Pont) (27290), Fiber Black VF (du Pont) (30235), Luxol Fast Black L (du Pont) (Solv. Black 17), Nirosine Base No. 424 (du Pont) (50415 B), Oil Black BG (du Pont) (Solv. Black 16), Rotalin Black RM (du Pont), Sevron Brilliant Red 3 B (du Pont); Basic Black DSC (Dye Specialties, Inc.), Hectolene Black (Dye Specialties, Inc.), Azosol Brilliant Blue B (GAF, Dyestuff and Chemical Division, Wayne, NJ) (Solv. Blue 9), Azosol Brilliant Green BA (GAF) (Solv. Green 2), Azosol Fast Brilliant Red B (GAF), Azosol Fast Orange RA Conc. (GAF) (Solv. Orange 20), Azosol Fast Yellow GRA Conc. (GAF) (13900 A), Basic Black KMPA (GAF), Benzofix Black CW-CF (GAF) (35435), Cellitazol BNFV Ex Soluble CF (GAF) (Disp. Black 9), Celliton Fast Blue AF Ex Conc (GAF) (Disp. Blue 9), Cyper Black IA (GAF) (Basic Black 3), Diamine Black CAP Ex Conc (GAF) (30235), Diamond Black EAN Hi Con. CF (GAF) (15710), Diamond Black PBBA Ex (GAF) (16505); Direct Deep Black EA Ex CF (GAF) (30235), Hansa Yellow G (GAF) (11680); Indanthrene Black BBK Powd. (GAF) (59850), Indocarbon CLGS Conc. CF (GAF) (53295), Katigen Deep Black NND Hi Conc. CF (GAF) (15711), Rapidogen Black 3 G (GAF) (Azoic Black 4); Sulphone Cyanine Black BA-CF (GAF) (26370), Zambezi Black VD Ex Conc. (GAF) (30015); Rubanox Red CP-1495 (The Sherwin-Williams Company, Cleveland, Ohio) (15630); Raven 11 (Columbian Carbon Company, Atlanta, Ga.), (carbon black aggregates with a particle size of about 25 $\mu$m), Statex B-12 (Columbian Carbon Co.) (a furnace black of 33 $\mu$m average particle size), and chrome green.

Particles may also include laked, or dyed, pigments. Laked pigments are particles that have a dye precipitated on them or which are stained. Lakes are metal salts of readily soluble anionic dyes. These are dyes of azo, triphenylmethane or anthraquinone structure containing one or more sulphonic or carboxylic acid groupings. They are usually precipitated by a calcium, barium or aluminum salt onto a substrate. Typical examples are peacock blue lake (CI Pigment Blue 24) and Persian orange (lake of CI Acid Orange 7), Black M Toner (GAF) (a mixture of carbon black and black dye precipitated on a lake).

A dark particle of the dyed type may be constructed from any light absorbing material, such as carbon black, or inorganic black materials. The dark material may also be selectively absorbing. For example, a dark green pigment may be used. Black particles may also be formed by staining latices with metal oxides, such latex copolymers consisting of any of butadiene, styrene, isoprene, methacrylic acid, methyl methacrylate, acrylonitrile, vinyl chloride, acrylic acid, sodium styrene sulfonate, vinyl acetate, chlorostyrene, dimethylaminopropylmethacrylamide, isocyanoethyl methacrylate and N-(isobutoxymethacrylamide), and optionally including conjugated diene compounds such as diacrylate, triacrylate, dimethylacrylate and trimethacrylate. Black particles may also be formed by a dispersion polymerization technique.

In the systems containing pigments and polymers, the pigments and polymers may form multiple domains within the electrophoretic particle, or be aggregates of smaller pigment/polymer combined particles. Alternatively, a central pigment core may be surrounded by a polymer shell. The pigment, polymer, or both can contain a dye. The optical purpose of the particle may be to scatter light, absorb light, or both. Useful sizes may range from 1 nm up to about 100 $\mu$m, as long as the particles are smaller than die bounding capsule. The density of the electrophoretic particle may be substantially matched to that of the suspending (i.e., electrophoretic) fluid. As defined herein, a suspending fluid has a density that is "substantially matched" to the density of the particle if the difference in their respective densities is between about zero and about two grams/milliliter ("g/ml"). This difference is preferably between about zero and about 0.5 g/ml.

Useful polymers for the particles include, but are not limited to: polystyrene, polyethylene, polypropylene, phenolic resins, du Pont Elvax resins (ethylene-vinyl acetate copolymers), polyesters, polyacrylates, polymethacrylates, ethylene acrylic acid or methacrylic acid copolymers (Nucrel Resins—du Pont, Primacor Resins—Dow Chemical), acrylic copolymers and terpolymers (Elvacite Resins—du Pont) and PMMA. Useful materials for homopolymer/pigment phase separation in high shear melt include, but are not limited to, polyethylene, polypropylene, poly(methyl methacrylate), poly(isobutyl methacrylate), polystyrene, polybutadiene, polyisoprene, polyisobutylene, poly(lauryl methacrylate), poly(stearyl methacrylate), poly(isobornyl methacrylate), poly(t-butyl methacrylate), poly(ethyl metliacrylate), poly(methyl acrylate), poly(ethyl acrylate), polyacrylonitrile, and copolymers of two or more of these materials. Some useful pigment/polymer complexes that are commercially available include, but are not limited to, Process Magenta PM 1776 (Magruder Color Company, Inc., Elizabeth, N.J.), Methyl Violet PMA VM6223 (Magruder Color Company, Inc., Elizabeth, N.J.), and Naphthol FGR RF6257 (Magruder Color Company, Inc., Elizabeth, N.J.).

The pigment-polymer composite may be formed by a physical process, (e.g., attrition or ball milling), a chemical process (e.g., microencapsulation or dispersion polymerization), or any other process known in the art of particle production. For example, the processes and materials for both the fabrication of liquid toner particles and the charging of those particles may be relevant.

New and useful electrophoretic particles may still be discovered, but a number of particles already known to those skilled in the art of electrophoretic displays and liquid toners can also prove useful. In general, the polymer requirements for liquid toners and encapsulated electrophoretic inks are similar, in that the pigment or dye must be easily incorporated therein, either by a physical, chemical, or physico-chemical process, may aid in the colloidal stability, and may contain charging sites or may be able to incorporate materials which contain charging sites. One general requirement from the liquid toner industry that is not shared by encapsulated electrophoretic inks is that the toner must be capable of "fixing" the image, i.e., heat fusing together to create a uniform film after the deposition of the toner particles.

Typical manufacturing techniques for particles may be drawn from the liquid toner and other arts and include ball milling, attrition, jet milling, etc. The process will be illustrated for the case of a pigmented polymeric particle. In such a case the pigment is compounded in the polymer, usually in some kind of high shear mechanism such as a screw extruder. The composite material is then (wet or dry) ground to a starting size of around 10 µm. It is then dispersed in a carrier liquid, for example ISOPAR® (Exxon, Houston, Tex.), optionally with some charge control agent(s), and milled under high shear for several hours down to a final particle size and/or size distribution.

Another manufacturing technique for particles is to add the polymer, pigment, and suspending fluid to a media mill. The mill is started and simultaneously heated to a temperature at which the polymer swells substantially with the solvent. This temperature is typically near 100° C. In this state, the pigment is easily encapsulated into the swollen polymer. After a suitable time, typically a few hours, the mill is gradually cooled back to ambient temperature while stirring. The milling may be continued for some time to achieve a small enough particle size, typically a few microns in diameter. The charging agents may be added at this time. Optionally, more suspending fluid may be added.

Chemical processes such as dispersion polymerization, mini- or micro-emulsion polymerization, suspension polymerization precipitation, phase separation, solvent evaporation, in situ polymerization, seeded emulsion polymerization, or any process which falls under the general category of microencapsulation may be used. A typical process of this type is a phase separation process wherein a dissolved polymeric material is precipitated out of solution onto a dispersed pigment surface through solvent dilution, evaporation, or a thermal change. Other processes include chemical means for staining polymeric latices, for example with metal oxides or dyes.

B. Suspending Fluid

The suspending fluid containing the particles can be chosen based on properties such as density, refractive index, and solubility. A preferred suspending fluid has a low dielectric constant (about 2), high volume resistivity (about $10^{15}$ ohm-cm), low viscosity (less than 5 centistokes ("cst")), low toxicity and environmental impact, low water solubility (less than 10 parts per million ("ppm")), high specific gravity (greater than 1.5), a high boiling point (greater than 90° C.), and a low refractive index (less than 1.2).

The choice of suspending fluid may be based on concerns of chemical inertness, density matching to the electrophoretic particle, or chemical compatibility with both the electrophoretic particle and bounding capsule. The viscosity of the fluid should be low when movement of the particles is desired. The refractive index of the suspending fluid may also be substantially matched to that of the particles. As used herein, the refractive index of a suspending fluid "is substantially matched" to that of a particle if the difference between their respective refractive indices is between about zero and about 0.3, and is preferably between about 0.05 and about 0.2.

Additionally, the fluid may be chosen to be a poor solvent for some polymers, which is advantageous for use in the fabrication of microparticles, because it increases the range of polymeric materials useful in fabricating particles of polymers and pigments. Organic solvents, such as halogenated organic solvents, saturated linear or branched hydrocarbons, silicone oils, and low molecular weight halogen-containing polymers are some useful suspending fluids. The suspending fluid may comprise a single fluid. The fluid will, however, often be a blend of more than one fluid in order to tune its chemical and physical properties. Furthermore, the fluid may contain surface modifiers to modify die surface energy or charge of the electrophoretic particle or bounding capsule. Reactants or solvents for the microencapsulation process (oil soluble monomers, for example) can also be contained in the suspending fluid. Charge control agents can also be added to the suspending fluid.

Useful organic solvents include, but are not limited to, epoxides, such as decane epoxide and dodecane epoxide; vinyl ethers, such as cyclohexyl vinyl ether and Decave® (International Flavors & Fragrances, Inc., New York, N.Y.); and aromatic hydrocarbons, such as toluene and naphthalene. Useful halogenated organic solvents include, but are not limited to, tetrafluorodibromoethylene, tetrachloroethylene, trifluorochloroethylene, 1,2,4-trichlorobenzene and carbon tetrachloride. These materials have high densities. Useful hydrocarbons include, but arc not limited to, dodecane, tetradecane, the aliphatic hydrocarbons in the Isopar® series (Exxon, Houston, Tex.), Norpar® (a series of normal paraffinic liquids), Shell-Sol® (Shell, Houston, Tex.), and Sol-Trol® (Shell), naplitha, and other petroleum solvents. These materials usually have low densities. Useful examples of silicone oils include, but are not limited to, octamethyl cyclosiloxane and higher molecular weight cyclic siloxanes, poly(methyl phenyl siloxane), hexamethyldisiloxane, and polydimethylsiloxane. These materials usually have low densities. Useful low molecular weight halogen-containing polymers include, but are not limited to, poly(chlorotrifluoroethylene) polymer (Halogenated Hydrocarbon Inc., River Edge, N.J.), Galden® (a perfluorinated ether from Ausimont, Morristown, N.J.), or Krytox® from du Pont (Wilmington, Del.). In a preferred embodiment, the suspending fluid is a poly(chlorotrifluoroethylene) polymer. In a particularly preferred embodiment, this polymer has a degree of polymerization from about 2 to about 10. Many of the above materials are available in a range of viscosities, densities, and boiling points.

The fluid must be capable of being formed into small droplets prior to a capsule being formed. Processes for forming small droplets include flow-through jets, membranes, nozzles, or orifices, as well as shear-based emulsifying schemes. The formation of small drops may be assisted by electrical or sonic fields. Surfactants and polymers can be used to aid in the stabilization and emulsification of the droplets in the case of an emulsion type encapsulation. One surfactant for use in displays of the invention is sodium dodecylsulfate.

It can be advantageous in some displays for the suspending fluid to contain an optically absorbing dye. This dye must be soluble in the fluid, but will generally be insoluble in the other components of the capsule. There is much flexibility in the choice of dye material. The dye can be a pure compound, or blends of dyes to achieve a particular color, including black. The dyes can be fluorescent, which would produce a display in which the fluorescence properties depend on the position of the particles. The dyes can be photoactive, changing to another color or becoming colorless upon irradiation with either visible or ultraviolet light, providing another means for obtaining an optical response. Dyes could also be polymerizable by, for example, thermal, photochemical or chemical diffusion processes, forming a solid absorbing polymer inside the bounding shell.

There are many dyes that can be used in encapsulated electrophoretic displays. Properties important here include light fastness, solubility in the suspending liquid, color, and cost. These dyes are generally chosen from the classes of azo, anthraquinone, and triphenylmethane type dyes and may be chemically modified so as to increase their solubility in the oil phase and reduce their adsorption by the particle surface.

A number of dyes already known to those skilled in the art of electrophoretic displays will prove useful. Useful azo dyes include, but are not limited to: the Oil Red dyes, and the Sudan Red and Sudan Black series of dyes. Useful anthraquinone dyes include, but are not limited to: the Oil Blue dyes, and the Macrolex Blue series of dyes. Useful triphenylmethane dyes include, but are not limited to, Michler's hydrol, Malachite Green, Crystal Violet, and Auramine O.

C. Charpe Control Agents and Particle Stabilizers

Charge control agents are used to provide good electrophoretic mobility to the electrophoretic particles. Stabilizers are used to prevent agglomeration of the electrophoretic particles, as well as prevent the electrophoretic particles from irreversibly depositing onto the capsule wall. Either component can be constructed from materials across a wide range of molecular weights (low molecular weight, oligomeric, or polymeric), and may be a single pure compound or a mixture. The charge control agent used to modify and/or stabilize the particle surface charge is applied as generally known in the arts of liquid toners, electrophoretic displays, non-aqueous paint dispersions, and engine-oil additives. In all of these arts, charging species may be added to non-aqueous media in order to increase electrophoretic mobility or increase electrostatic stabilization. The materials can improve steric stabilization as well. Different theories of charging are postulated, including selective ion adsorption, proton transfer, and contact electrification.

An optional charge control agent or charge director may be used. These constituents typically consist of low molecular weight surfactants, polymeric agents, or blends of one or more components and serve to stabilize or otherwise modify the sign and/or magnitude of the charge on the electrophoretic particles. The charging properties of the pigment itself may be accounted for by taking into account the acidic or basic surface properties of the pigment, or the charging sites may take place on the carrier resin surface (if present), or a combination of the two. Additional pigment properties which may be relevant are the particle size distribution, the chemical composition, and the lightfastness.

Charge adjuvants may also be added. These materials increase the effectiveness of the charge control agents or charge directors. The charge adjuvant may be a polyhydroxy compound or an aminoalcohol compound, and is preferably soluble in the suspending fluid in an amount of at least 2% by weight. Examples of polyhydroxy compounds which contain at least two hydroxyl groups include, but are not limited to, ethylene glycol, 2,4,7,9-tetramethyldecyn-4,7-diol, poly(propylene glycol), pentaethylene glycol, tripropylene glycol, triethylene glycol, glycerol, pentaerythritol, glycerol tris(12-hydroxystearate), propylene glycerol monohydroxy-stearate, and ethylene glycol monohydroxystearate. Examples of aminoalcohol compounds which contain at least one alcohol function and one amine function in the same molecule include, but are not limited to, triisopropanolamine, triethanolamine, ethanolamine, 3-amino-1-propanol, o-aminophenol, 5-amino-1-pentanol, and tetrakis(2-hydroxy-ethyl)ethylencdiamine. The charge adjuvant is preferably present in the suspending fluid in an amount of about 1 to about 100 milligrams per gram ("mg/g") of the particle mass, and more preferably about 50 to about 200 mg/g.

The surface of the particle may also be chemically modified to aid dispersion, to improve surface charge, and to improve the stability of the dispersion, for example. Surface modifiers include organic siloxanes, organohalogen silanes and other functional silane coupling agents (Dow Coming® Z-6070, Z-6124, and 3 additive, Midland, Mich.); organic titanates and zirconates (Tyzor® TOT, TBT, and TE Series, du Pont); bydrophobing agents, such as long chain ($C_{12}$ to $C_{50}$) alkyl and alkyl benzene sulphonic acids, fatty amines or diamines and their salts or quaternary derivatives; and amphipathic polymers which can be covalently bonded to the particle surface.

In general, it is believed that charging results as an acid-base reaction between some moiety present in the continuous phase and the particle surface. Thus useful materials are those which are capable of participating in such a reaction, or any other charging reaction as known in the art.

Different non-limiting classes of charge control agents which are useful include organic sulfates or sulfonates, metal soaps, block or comb copolymers, organic amides, organic zwitterions, and organic phosphates and phosplionates. Useful organic sulfates and sulfonates include, but are not limited to, sodium bis(2-ethylhexyl) sulfosuccinate, calcium dodecylbenzenesulfonate, calcium petroleum sulfonate, neutral or basic barium dinonylnaphthalene sulfonate, neutral or basic calcium dinonylnaphthalene sulfonate, dodecylbenzenesulfonic acid sodium salt, and ammonium lauryl sulfate. Useful metal soaps include, but are not limited to, basic or neutral barium petronate, calcium petronate, Co—, Ca—, Cu—, Mn—, Ni—, Zn—, and Fe—salts of naplitlenic acid, Ba—, Al—, Zn—, Cu—, Pb—, and Fe—salts of stearic acid, divalent and trivalent metal carboxylates, such as aluminum tristearate, aluminum octanoate, lithium heptanoate, iron stearate, iron distearate, barium stearate, chromium stearate, magnesium octanoate, calcium stearate, iron naphthenate, zinc naphthenate, Mn—and Zn—heptanoate, and Ba—, Al—, Co—, Mn—, and Zn—octanoate. Useful block or comb copolymers include, but are not limited to, AB diblock copolymers of (A) polymers of 2(N,N-dimcethylamino)ethyl methacrylate quaternized with methyl p-toluenesulfonate and (B) poly(2-ethylhexyl methacrylate), and comb graft copolymers with oil soluble tails of poly(12-hydroxystearic acid) and having a molecular weight of about 1800, pendant on an oil-soluble anchor group of poly(methyl methacrylate-methacrylic acid). Useful organic amides include, but are not limited to, polyisobutylene succinimides such as OLOA 1200, and N-vinylpyrrolidone polymers. Useful organic zwitterions include, but are not limited to, lecithin. Useful organic phosphates and phosphonates include, but are not limited to, the sodium salts of phosphated mono- and di-glyccrides with saturated and unsaturated acid substituents.

Particle dispersion stabilizers may be added to prevent particle flocculation or attachment to the capsule walls. For the typical high resistivity liquids used as suspending fluids in electrophoretic displays, non-aqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

D. Encapsulation

Encapsulation of the internal phase may be accomplished in a number of different ways. Numerous suitable procedures for microencapsulation are detailed in both Microencapsulation, Processes and Applications, (I. E. Vandegaer, ed.), Plenum Press, New York, N.Y. (1974) and Gutcho, Microcapsules and Microencapsulation Techniques, Noyes Data Corp., Park Ridge, N.J. (1976). The processes fall into several general categories, all of which can be applied to the present invention: interfacial polymerization, in situ polymerization, physical processes, such as coextrusion and other phase separation processes, in-liquid curing, and simple/complex coacervation.

Numerous materials and processes should prove useful in formulating displays of the present invention. Useful materials for simple coacervation processes to form the capsule include, but are not limited to, gelatin, poly(vinyl alcohol), poly(vinyl acetate), and cellulosic derivatives, such as, for example, carboxymethylcellulose. Useful materials for complex coacervation processes include, but are not limited to, gelatin, acacia, carageenan, carboxymethylcellulose, hydrolyzed styrene anhydride copolymers, agar, alginate, casein, albumin, methyl vinyl ether co-maleic anhydride, and cellulose phthalate. Useful materials for phase separation processes include, but are not limited to, polystyrene, poly (methyl methacrylate) (PMMA), poly(ethyl methacrylate), poly(butyl methacrylate), ethyl cellulose, poly (vinylpyridine), and polyacrylonitrile. Useful materials for in situ polymerization processes include, but are not limited to, polyhydroxyamides, with aldehydes, melamine, or urea and formaldehyde; water-soluble oligomers of the condensate of melamine, or urea and formaldehyde; and vinyl monomers, such as, for example, styrene, methyl methacrylate (MMA) and acrylonitrile. Finally, useful materials for interfacial polymerization processes include, but are not limited to, diacyl chlorides, such as, for example, sebacoyl, adipoyl, and di- or poly- amines or alcohols, and isocyanates. Useful emulsion polymerization materials may include, but are not limited to, styrene, vinyl acetate, acrylic acid, butyl acrylate, t-butyl acrylate, methyl methacrylate, and butyl methacrylate.

Capsules produced may be dispersed into a curable carrier, resulting in an ink which may be printed or coated on large and arbitrarily shaped or curved surfaces using conventional printing and coating techniques.

In the context of the present invention, one skilled in the art will select an encapsulation procedure and wall material based on the desired capsule properties. These properties include the distribution of capsule radii; electrical, mechanical, diffusion, and optical properties of the capsule wall; and chemical compatibility with the internal phase of the capsule.

The capsule wall generally has a high electrical resistivity. Although it is possible to use walls with relatively low resistivities, this may limit performance in requiring relatively higher addressing voltages. The capsule wall should also be mechanically strong (although if the finished capsule powder is to be dispersed in a curable polymeric binder for coating, mechanical strength is not as critical). The capsule wall should generally not be porous. If, however, it is desired to use an encapsulation procedure that produces porous capsules, these can be overcoated in a post-processing step (i.e., a second encapsulation). Moreover, if the capsules are to be dispersed in a curable binder, the binder will serve to close the pores. The capsule walls should be optically clear. The wall material may, however, be chosen to match the refractive index of the internal phase of the capsule (i.e., the suspending fluid) or a binder in which the capsules are to be dispersed. For some applications (e.g., interposition between two fixed electrodes), monodispersed capsule radii are desirable.

An encapsulation technique that is suited to the present invention involves a polymerization between urea and formaldehyde in an aqueous phase of an oil/water emulsion in the presence of a negatively charged, carboxyl-substituted, linear hydrocarbon polyelectrolyte material. The resulting capsule wall is a urea/ formaldehyde copolymer, which discretely encloses the internal phase. The capsule is clear, mechanically strong, and has good resistivity properties.

The related technique of in situ polymerization utilizes an oil/water emulsion, which is formed by dispersing the electrophoretic fluid (i.e., the dielectric liquid containing a suspension of the pigment particles) in an aqueous environment. The monomers polymerize to form a polymer with higher affinity for the internal phase than for the aqueous phase, thus condensing around the emulsified oily droplets. In one in situ polymerization process, urea and formaldehyde condense in the presence of poly(acrylic acid) (see, e.g., U.S. Pat. No. 4,001,140). In other processes, described in U.S. Pat. No. 4,273,672, any of a variety of cross-linking agents borne in aqueous solution is deposited around microscopic oil droplets. Such cross-linking agents include aldehydes, especially formaldehyde, glyoxal, or glutaraldehyde; alum; zirconium salts; and polyisocyanates.

The coacervation approach also utilizes an oil/water emulsion. One or more colloids are coacervated (i.e., agglomerated) out of the aqueous phase and deposited as shells around the oily droplets through control of temperature, pH and/or relative concentrations, thereby creating the microcapsule. Materials suitable for coacervation include gelatins and gum arabic. See, e.g., U.S. Pat. No. 2,800,457.

The interfacial polymerization approach relies on the presence of an oil-soluble monomer in the electrophoretic composition, which once again is present as an emulsion in an aqueous phase. The monomers in the minute hydrophobic droplets react with a monomer introduced into the aqueous phase, polymerizing at the interface between the droplets and the surrounding aqueous medium and forming shells around the droplets. Although the resulting walls are relatively thin and may be permeable, this process does not require the elevated temperatures characteristic of some other processes, and therefore affords greater flexibility in terms of choosing the dielectric liquid.

Coating aids can be used to improve the uniformity and quality of the coated or printed electrophoretic ink material. Wetting agents are typically added to adjust the interfacial tension at the coating/substrate interface and to adjust the liquid/air surface tension. Wetting agents include, but are not limited to, anionic and cationic surfactants, and nonionic species, such as silicone or fluoropolymer-based materials. Dispersing agents may be used to modify the interfacial tension between the capsules and binder, providing control over flocculation and particle settling.

Surface tension modifiers can be added to adjust the air/ink interfacial tension. Polysiloxanes are typically used in such an application to improve surface leveling while minimizing other defects within the coating. Surface tension modifiers include, but are not limited to, fluorinated surfactants, such as, for example, the Zonyl® series from du Pont, the Fluorad® series from 3M (St. Paul, Minn.), and the fluoroalkyl series from Autochem (Glen Rock, N.J.); siloxanes, such as, for example, Silwet® from Union Carbide (Danbury, Conn.); and polyethoxy and polypropoxy alcohols. Antifoams, such as silicone and silicone-free polymeric materials, may be added to enhance the movement of air from within the ink to the surface and to facilitate the rupture of bubbles at the coating surface. Other useful antifoams include, but are not limited to, glyceryl esters, polyhydric alcohols, compounded antifoams, such as oil solutions of alkylbenzenes, natural fats, fatty acids, and metallic soaps, and silicone antifoaming agents made from the combination of dimethyl siloxane polymers and silica. Stabilizers such as UV-absorbers and antioxidants may also be added to improve the lifetime of the ink.

1. EXAMPLE 1

The following procedure describes gelatin/acacia microencapsulation for use in electrophoretic displays of the present invention.

a. Preparation of Oil (Internal) Phase

To a 1L flask is added 0.5 g of Oil Blue N (Aldrich, Milwaukee, Wis.), 0.5 g of Sudan Red 7B (Aldrich), 417.25 g of Halogenated Hydrocarbon Oil 0.8 (Halogenated hydrocarbon Products Corp., River Edge, N.J.), and 73.67 g of Isopar-G® (Exxon, Houston, Tex.). The mixture is stirred at 60° C. for six hours and is then cooled to room temperature. 50.13 g of the resulting solution is placed in a 50 mL polypropylene centrifuge tube, to which is added 1.8 g of titanium dioxide ($TiO_2$) (du Pont), 0.78 g of a 10% solution of OLOA 1200 (Chevron, Somerset, N.J.), in Halogenated Hydrocarbon Oil 0.8, and 0.15 g of Span 85 (Aldrich). This mixture is then sonicated for five minutes at power 9 in an Aquasonic Model 75D sonicator (VWR, Westchester, Pa.) at 30° C.

b. Preparation of Aqueous Phase 10.0 g of acacia (Aldrich) is dissolved in 100.0 g of water with stirring at room temperature for 30 minutes. The resulting mixture is decanted into two 50 mL polypropylene centrifuge tubes and centrifuged at about 2000 rpm for 10 minutes to remove insoluble material. 66 g of the purified solution is then decanted into a 500 mL non-baffled jacketed reactor, and the solution is then heated to 40° C. A six-blade (vertical geometry) paddle agitator is then placed just beneath the surface of the liquid. While agitating the solution at 200 rpm, 6 g of gelatin (300 bloom, type A, Aldrich) is carefully added over about 20 seconds in order to avoid lumps. Agitation is then reduced to 50 rpm to reduce foaming. The resulting solution is then stirred for 30 minutes.

c. Encapsulation

With agitation at 200 rpm, the oil phase, prepared as described above, is slowly poured over about 15 seconds into the aqueous phase, also prepared as described above. The resulting oil/water emulsion is allowed to emulsify for 20 minutes. To this emulsion is slowly added over about 20 seconds 200 g of water that has been preheated to 40° C. The pH is then reduced to 4.4 over five minutes with a 10% acetic acid solution (acetic acid from Aldrich). The pH is monitored using a pH meter that was previously calibrated with pH 7.0 and pH 4.0 buffer solutions. The resultant mixture is stirred for 40 minutes. 150 g of water that has been preheated to 40° C. are then added, and the contents of the reactor are then cooled to 10° C. When the solution temperature reaches 10° C., 3.0 mL of a 37% formalin solution (Aldrich) is added, and the solution is further stirred for another 60 minutes. 20 g of sodium carboxymethylcellulose (NaCMC) is added, and the pH is then raised to 10.0 by the addition of a 20 wt. % solution of sodium hydroxide (NaOH). The thermostat bath is then set to 40° C. and allowed to stir for another 70 minutes. The slurry is allowed to cool to room temperature overnight with stirring. The resulting capsule slurry is then ready to be sieved.

d. Formation of Display

Two procedures believed to be appropriate for preparing an electrophoretic display of the present invention from the above capsule slurry are described below.

i. Procedure Using a Urethane Binder

The resulting capsule slurry from above is mixed with the aqueous urethane binder NeoRez R-9320 (Zeneca Resins, Wilmington, Mass.) at a ratio of one part binder to 10 parts capsules. To provide spacers, 100 μm glass spheres are also mixed into the slurry binder mixture at a ratio of one spacer to 10,000 capsules. The resulting mixture is then coated using a doctor blade in an approximately 100–125 μm thick sheet of indium-tin oxide sputtered polyester film. The blade gap of the doctor blade is controlled at 0.18 mm so as to lay down a single layer of capsules. The coated film is then dried in hot air (60° C.) for 30 minutes. After drying, the dried film is hot laminated at 60° C. to a backplane comprising an approximately 100–25 µm thick sheet of polyester screen printed with thick film silver and dielectric inks with a pressure of 15 psi in a hot roll laminate from Cheminstruments, Fairfield, Ohio. The backplane is connected to the film using an anisotropic tape. The conductive areas form addressable areas of the resulting display.

ii. Procedure Using a Urethane/Polyvinyl Alcohol Binder

The resulting capsule slurry from above is mixed with the aqueous binder comprising a mixture of NeoRez R-966 (Zeneca Resins) and a 20% solution of Airvol 203 (a poly(vinyl alcohol), Airvol Industries, Allentown, Pa.) at a ratio of one part Airvol 203 solution to one part NeoRez R-966 to five parts capsules. To provide spacers, 100 µm glass spheres are also mixed into the slurry binder mixture at a ratio of one spacer to 10,000 capsules. The resulting mixture is then coated using a doctor blade in an approximately 100–125 µm thick sheet of indium-tin oxide sputtered polyester film. The blade gap of the doctor blade is controlled at 0.18 mm so as to lay down a single layer of capsules. The coated film is then dried in hot air (60° C.) for 30 minutes. After drying, a thick film silver ink is then printed directly onto the back of the dried film and allowed to cure at 60° C. The conductive areas form the addressable areas of the display.

2. EXAMPLE 2

The following is an example of the preparation of microcapsules by in sit polymerization.

In a 500 mL non-baffled jacketed reactor is mixed 50 mL of a 10 wt. % aqueous solution of ethylene co-maleic anhydride (Aldrich), 100 mL water, 0.5 g resorcinol (Aldrich), and 5.0 g urea (Aldrich). The mixture is stirred at 200 rpm and the pH adjusted to 3.5 with a 25 wt. % NaOH solution over a period of 1 minute. The pH is monitored using a pH meter that was previously calibrated with pH 7.0 and pH 4.0 buffer solutions. To this is slowly added the oil phase, prepared as described above in Ex. 1, and agitation is increased to 450 rpm to reduce the average particle size to less than 200 µm. 12.5 g of a 37 wt. % aqueous formaldehyde solution is then added and the temperature raised to 55° C. The solution is heated at 55° C. for two hours.

3. EXAMPLE 3

The following is an example of the preparation of microcapsules by interfacial polymerization.

To 44 g of the oil phase, prepared as described above in Example 1, is added 1.0 g of sebacoyl chloride (Aldrich). Three milliliters of the mixture are then dispersed in 200 mL of water with stirring at 300 rpm at room temperature. To this dispersion is then added 2.5 mL of a 10 wt. % aqueous solution of 1,6-diaminohexane. Capsules form after about one hour.

E. Binder Material

The binder typically is used as an adhesive medium that supports and protects the capsules, as well as binds the electrode materials to the capsule dispersion. A binder can be non-conducting, semiconductive, or conductive. Binders are available in many forms and chemical types. Among these are water-soluble polymers, waterborne polymers, oil-soluble polymers, thermoset and thermoplastic polymers, and radiation-cured polymers.

Among the water-soluble polymers are the various polysaccharides, the polyvinyl alcohols, N-methylpyrrolidone, N-vinylpyrrolidone, the various Carbowax® species (Union Carbide, Danbury, Conn.), and poly(2-hydroxyethyl acrylate).

The water-dispersed or water-borne systems are generally latex compositions, typified by the Neorez® and Neocryl® resins (Zeneca Resins, Wilmington, Mass.), Acrysol® (Rohm and Haas, Philadelphia, Pa.), Bayhydrol® (Bayer, Pittsburgh, Pa.), and the Cytec Industries (West Paterson, N.J.) HP line. These are generally latices of polyurethanes, occasionally compounded with one or more of the acrylics, polyesters, polycarbonates or silicones, each lending the final cured resin in a specific set of properties defined by glass transition temperature, degree of "tack," softness, clarity, flexibility, water permeability and solvent resistance, elongation modulus and tensile strength, thermoplastic flow, and solids level. Some water-borne systems can be mixed with reactive monomers and catalyzed to form more complex resins. Some can be further cross-linked by the use of a cross-linking reagent, such as an aziridine, for example, which reacts with carboxyl groups.

A typical application of a water-borne resin and aqueous capsules follows. A volume of particles is centrifuged at low speed to separate excess water. After a given centrifugation process, for example 10 minutes at 60 xgravity ("g"), the capsules 180 are found at the bottom of the centrifuge tube 182, while the water portion 184 is at the top. The water portion is carefully removed (by decanting or pipetting). The mass of the remaining capsules is measured, and a mass of resin is added such that the mass of resin is, for example, between one eighth and one tenth of the weight of the capsules. This mixture is gently mixed on an oscillating mixer for approximately one half hour. After about one half hour, the mixture is ready to be coated onto tie appropriate substrate.

The thermoset systems are exemplified by the family of epoxies. These binary systems can vary greatly in viscosity, and the reactivity of the pair determines the "pot life" of the mixture. If the pot life is long enough to allow a coating operation, capsules may be coated in an ordered arrangement in a coating process prior to the resin curing and hardening.

Thermoplastic polymers, which are often polyesters, are molten at high temperatures. A typical application of this type of product is hot-melt glue. A dispersion of heat-resistant capsules could be coated in such a medium. The solidification process begins during cooling, and die final hardness, clarity and flexibility are affected by the branching and molecular weight of the polymer.

Oil or solvent-soluble polymers are often similar in composition to the water-borne system, with the obvious exception of die water itself. The latitude in formulation for solvent systems is enormous, limited only by solvent choices and polymer solubility. Of considerable concern in solvent-based systems is the viability of the capsule itself; the integrity of the capsule wall cannot be compromised in any way by the solvent.

Radiation cure resins are generally found among the solvent-based systems. Capsules may be dispersed in such a medium and coated, and the resin may then be cured by a timed exposure to a threshold level of ultraviolet radiation, either long or short wavelength. As in all cases of curing polymer resins, final properties are determined by the branching and molecular weights of the monomers, oligomers and cross-linkers.

A number of "water-reducible" monomers and oligomers arc, however, marketed. In the strictest sense, they are not water soluble, but water is an acceptable diluent at low concentrations and can be dispersed relatively easily in the mixture. Under these circumstances, water is used to reduce the viscosity (initially from thousands to hundreds of thousands centipoise). Water-based capsules, such as those made from a protein or polysaccharide material, for example, could be dispersed in such a medium and coated, provided the viscosity could be sufficiently lowered. Curing in such systems is generally by ultraviolet radiation.

Like other encapsulated electrophoretic displays, the encapsulated electrophoretic displays of the present invention provide flexible, reflective displays that can be manufactured easily and consume little power (or no power in the case of bistable displays in certain states). Such displays, therefore, can be incorporated into a variety of applications and can take on many forms. Once the electric field is removed, the electrophoretic particles can be generally stable. Additionally, providing a subsequent electric charge can alter a prior configuration of particles. Such displays may include, for example, a plurality of anisotropic particles and a plurality of second particles in a suspending fluid. Application of a first electric field may cause the anisotropic particles to assume a specific orientation and present an optical property. Application of a second electric field may then cause the plurality of second particles to translate, thereby disorienting the anisotropic particles and disturbing the optical property. Alternatively, the orientation of the anisotropic particles may allow easier translation of the plurality of second particles. Alternatively or in addition, the particles may have a refractive index that substantially matches the refractive index of the suspending fluid.

As already mentioned, an encapsulated electrophoretic display can be constructed so that the optical state of the display is stable for some length of time. When the display has two states that are stable in this manner, the display is bistable, within the meaning of that term as previously defined; if more than two states of the display are stable, then the display is multistable. However, whether a display is effectively bistable state depends upon the display's application. A slowly decaying optical state can be effectively bistable if the optical state is substantially unchanged over the required viewing time. For example, in a display that is updated every few minutes, a display image that is stable for hours or days is effectively bistable for a particular application. Alternatively, it is possible to construct encapsulated electrophoretic displays in which the image decays quickly once the addressing voltage to the display is removed (i.e., the display is not bistable or multistable). Whether or not an encapsulated electrophoretic display is bistable, and its degree of bistability, can be controlled through appropriate chemical modification of the electrophoretic particles, the suspending fluid, the capsule, and binder materials.

An encapsulated electrophoretic display may take many forms. The capsules of such a display may be of any size or shape. The capsules may, for example, be spherical and may have diameters in the millimeter range or the micron range, but are preferably from about ten to about a few hundred microns. The particles within the capsules of such a display may be colored, luminescent, light-absorbing or transparent, for example.

From the foregoing description, it will be seen that die encapsulated electrophoretic media and displays of the present invention preserve all the advantages of prior art encapsulated electrophoretic media and displays, while rendering the encapsulated electrophoretic medium less susceptible to damage from pressure exerted upon the medium. Thus, the media and displays of the present invention may be useful in applications where prior art encapsulated electrophoretic media and displays cannot be used because of their susceptibility to pressure damage.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. An encapsulated electrophoretic medium comprising a layer of capsules, each of said capsules comprising a liquid and at least one particle disposed within the liquid and capable of moving therethrough on application of an electric field to the medium, the layer of capsules having the form of a lamina having a thickness substantially less than its other two dimensions, the medium further comprising a plurality of spacers dispersed among the capsules, the dimension of the spacers parallel to the thickness of the lamina being from 0.9 to 1.0 times this thickness.

2. A medium according to claim 1 wherein at least one of the spacers has substantially the form of a sphere.

3. A medium according to claim 1 wherein at least one of the spacers has substantially the form of a rod.

4. A medium according to claim 1 wherein the spacers are formed from glass and/or a polymeric material.

5. A medium according to claim 1 wherein the spacers are formed from a substantially transparent material.

6. A medium according to claim 1 wherein the ratio of spacers to capsules is in the range of from about 1:100 to about 1:1,000,000.

7. A medium according to claim 6 wherein the ratio of spacers to capsules is in the range of from about 1:1,000 to about 1:100,000.

8. A medium according to claim 1 wherein the liquid has a optical property differing from that of the at least one particle.

9. A medium according to claim 1 wherein the liquid has disposed therein at least one first particle having a first optical property and a first electrophoretic mobility and at least one second particle having a second optical property different from the first optical property and a second electrophoretic mobility different from the first electrophoretic mobility.

10. A medium according to claim 9 wherein the first and second particles bear charges of opposite polarity.

11. A medium according to claim 1 further comprising a binder disposed between the capsules.

12. An electrophoretic display comprising an encapsulated electrophoretic medium according to claim 1 in combination with first and second electrodes disposed on opposed sides of the electrophoretic medium, at least one of the first and second electrodes being light transmissive.

13. An electrophoretic display according to claim 12 further comprising first and second substrates disposed on opposed sides of the electrophoretic medium, the first and second substrates being secured to the first and second electrodes respectively.

14. An electrophoretic display according to claim 13 wherein the first and second electrodes and the first and second substrates are all flexible.

15. An electrophoretic display according to claim 12 further comprising touch sensing means disposed on the opposed side of one of the first and second electrodes from the electrophoretic medium.

16. An electrophoretic display according to claim 12 wherein at least one of the spacers is secured to, or integral with, one of the first and second electrodes.

17. An electrophoretic display according to claim 13 wherein at least one of the spacers is secured to, or integral with, one of the first and second substrates.

18. A method of forming an electrophoretic display, which method comprises:
   (a) providing a substrate; and
   (b) providing, adjacent the substrate, an encapsulated electrophoretic medium comprising a layer of capsules, each of said capsules comprising a liquid and at least one particle disposed within the liquid and capable of moving therethrough on application of an electric field to the medium, the layer of capsules having the form of a lamina having a thickness substantially less than its other two dimensions, the medium further comprising a plurality of spacers dispersed among the capsules, the dimension of the spacers parallel to the thickness of die lamina being from 0.9 to 1.0 times this thickness.

19. A method according to claim 18 wherein step (b) is effected by providing a mixture of the capsules and the spacers in a binder, and coating the surface of the substrate with said mixture.

20. A method according to claim 18 wherein step (b) is effected by providing a mixture of the capsules with a binder, coating the surface of the substrate with said mixture, and dispersing the spacers among the capsules.

21. A method according to claim 18 further comprising laminating a second substrate to the layer of capsules so that the two substrates lie on opposed sides of said layer.

22. A method according to claim 18 wherein the substrate bears a conductive coating.

23. A method according to claim 18 wherein at least one of the spacers has substantially the form of a sphere.

24. A method according to claim 18 wherein at least one of the spacers has substantially the form of a rod.

25. A method according to claim 18 wherein the spacers are formed from glass and/or a polymeric material.

26. A method according to claim 18 wherein the spacers are formed from a substantially transparent material.

27. A method according to claim 18 wherein the ratio of spacers to capsules is in the range of from about 1:100 to about 1:1,000,000.

28. A method according to claim 18 wherein the ratio of spacers to capsules is in the range of from about 1:1,000 to about 1:100,000.

* * * * *